United States Patent
Euverard et al.

[11] 3,901,377
[45] Aug. 26, 1975

[54] TRANSFER CONVEYOR INCLUDING SUPPORTS MOVABLE TO A BRIDGING POSITION

[75] Inventors: Maynard R. Euverard, Clarendon Hills; Henry A. Heide, Addison, both of Ill.

[73] Assignee: Velten & Pulver, Inc., Chicago Ridge, Ill.

[22] Filed: July 11, 1974

[21] Appl. No.: 487,591

[52] U.S. Cl. .................... 198/82; 198/102; 198/195
[51] Int. Cl.² .......................................... B65G 37/00
[58] Field of Search ....... 198/82, 75, 102, 194, 195, 198/76, 110, 189

[56] References Cited
UNITED STATES PATENTS

| | | | |
|---|---|---|---|
| 3,447,668 | 6/1969 | Jernigan | 198/195 |
| 3,517,925 | 6/1970 | Hutz | 198/102 |

FOREIGN PATENTS OR APPLICATIONS

| | | | |
|---|---|---|---|
| 690,858 | 4/1953 | United Kingdom | 198/102 |
| 225,851 | 3/1969 | Sweden | 198/102 |

*Primary Examiner*—Richard A. Schacher
*Assistant Examiner*—James M. Slattery
*Attorney, Agent, or Firm*—Prangley, Dithmar, Vogel, Sandler & Stotland

[57] ABSTRACT

A transfer conveyor for smoothly receiving articles from the outfeed end of an associated conveyor. A plurality of supports are mounted for rotational movement with respect to the chains of a standard link conveyor and bridge the gap between the outfeed end of the associated conveyor and the infeed end of the transfer conveyor to facilitate the smooth transfer of articles therebetween. Guide mechanism is provided to control the position of the supports at both the infeed end and the outfeed end of the transfer conveyor. Mechanism is disclosed for moving the supports among the bridging position, the conveying position and the storage position thereof.

18 Claims, 11 Drawing Figures

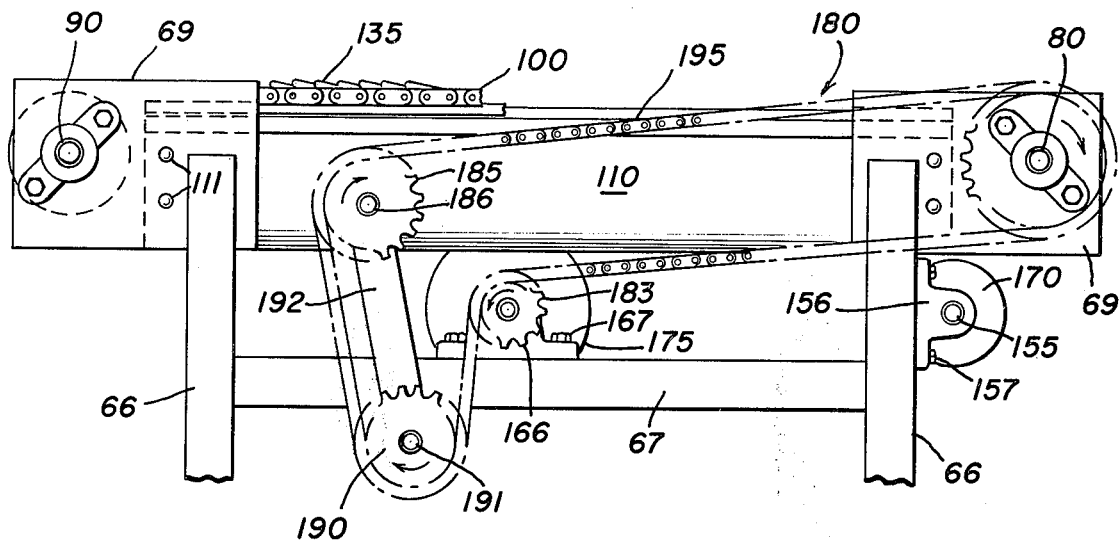

TRANSFER CONVEYOR INCLUDING SUPPORTS MOVABLE TO A BRIDGING POSITION

BACKGROUND OF THE INVENTION

In many industries articles are transferred by a plurality of conveyors which are closely spaced one from another. The transfer of the conveyed articles from one conveyor to another often presents difficult problems. Articles are not always evenly transferred and slowdowns occur at the separation between the conveyors. A further problem is that some articles will jam in the gap between conveyors, thereby causing work stoppages and the like. All of the above difficulties are obviated by the present invention.

SUMMARY OF THE INVENTION

This invention relates to a tranfer conveyor for smoothly receiving articles from an associated conveyor, and more particularly to a transfer conveyor wherein the supports bridge the distance or gap between the transfer conveyor and an associated conveyor, thereby to facilitate the transfer of articles from the associated conveyor.

It is a general object of the present invention to provide a transfer conveyor for smoothly receiving articles from the outfeed end of an associated conveyor.

It is an important object of the present invention to provide a transfer conveyor for smoothly receiving articles from the outfeed end of an associated conveyor disposed adjacent to the infeed end of the transfer conveyor, the transfer conveyor comprising an endless belt movable along a conveying reach from the infeed end of the transfer conveyor to the outfeed end thereof and along a return reach from the outfeed end of the transfer conveyor to the infeed end thereof, a plurality of supports mounted on the endless belt and movable from a conveying position to a storage position and then to a bridging position and back to the conveying position, the supports in the bridging position thereof extending toward the outfeed end of the associated conveyor with the supports at the infeed end of the transfer conveyor overlying the outfeed end of the associated conveyor and bridging the gap between the associated conveyor and the transfer conveyor, motor means for moving the endless belt and the supports mounted thereon in a closed path along the conveying reach and the return reach between the infeed end of the transfer conveyor and the outfeed end thereof, and means for moving the supports when on the return reach of the endless belt from the storage position to the bridging position and when on the conveying reach to the conveying position as the endless belt is driven by the motor means, whereby articles conveyed from the outfeed end of the associated conveyor are received on the supports in the bridging positions thereof and are conveyed along the conveying reach to the outfeed end of the transfer conveyor.

Another object of the present invention is to provide a transfer conveyor of the type set forth wherein each of the supports is formed of a rod shaped to provide a central support surface with two outwardly extending ends adapted to be freely mounted on spaced apart endless belts for free swinging movement about an axis formed by the outwardly extending ends.

Still another object of the present invention is to provide a transfer conveyor of the type set forth wherein each of the supports is formed of a rod shaped to provide an extended support surface with two inwardly extending ends adapted to be freely mounted on a pair of spaced apart endless belts for free swinging movement about an axis formed by the inwardly extending ends.

A further object of the present invention is to provide a transfer conveyor of the type set forth having means including a second endless belt positioned to contact the supports in the storage position thereof for moving the supports when on the return reach of the endless belts from the storage position to the bridging position.

A still further object of the present invention is to provide a transfer conveyor of the type set forth having means including a guide positioned to trap the supports therein for moving the supports when on the return reach of the endless belt from the storage position to the bridging position.

A final object of the present invention is to provide a transfer conveyor of the type set forth including means for controlling the position of the supports during transfer thereof from the conveying reach to the return reach to prevent interference by the supports with the infeed end of an associated removal conveyor disposed adjacent to the outfeed end of the transfer conveyor.

These and other objects of the present invention together with further objects and advantages thereof will be best understood by reference to the following specification taken in connection with the accompanying drawings:

BRIEF DESCRIPTION OF THE DRAWINGS

FIG. 5 is a side elevational view of the transfer conveyor illustrated in FIG. 1, particularly showing the drive mechanism therefor;

FIG. 6 is a sectional view of the transfer conveyor illustrated in FIG. 1, taken along lines 6—6 thereof;

FIG. 7 is an enlarged elevational view of the supports of the transfer conveyor illustrated in FIG. 1;

DESCRIPTION OF THE PREFERRED EMBODIMENT

Figure 1:
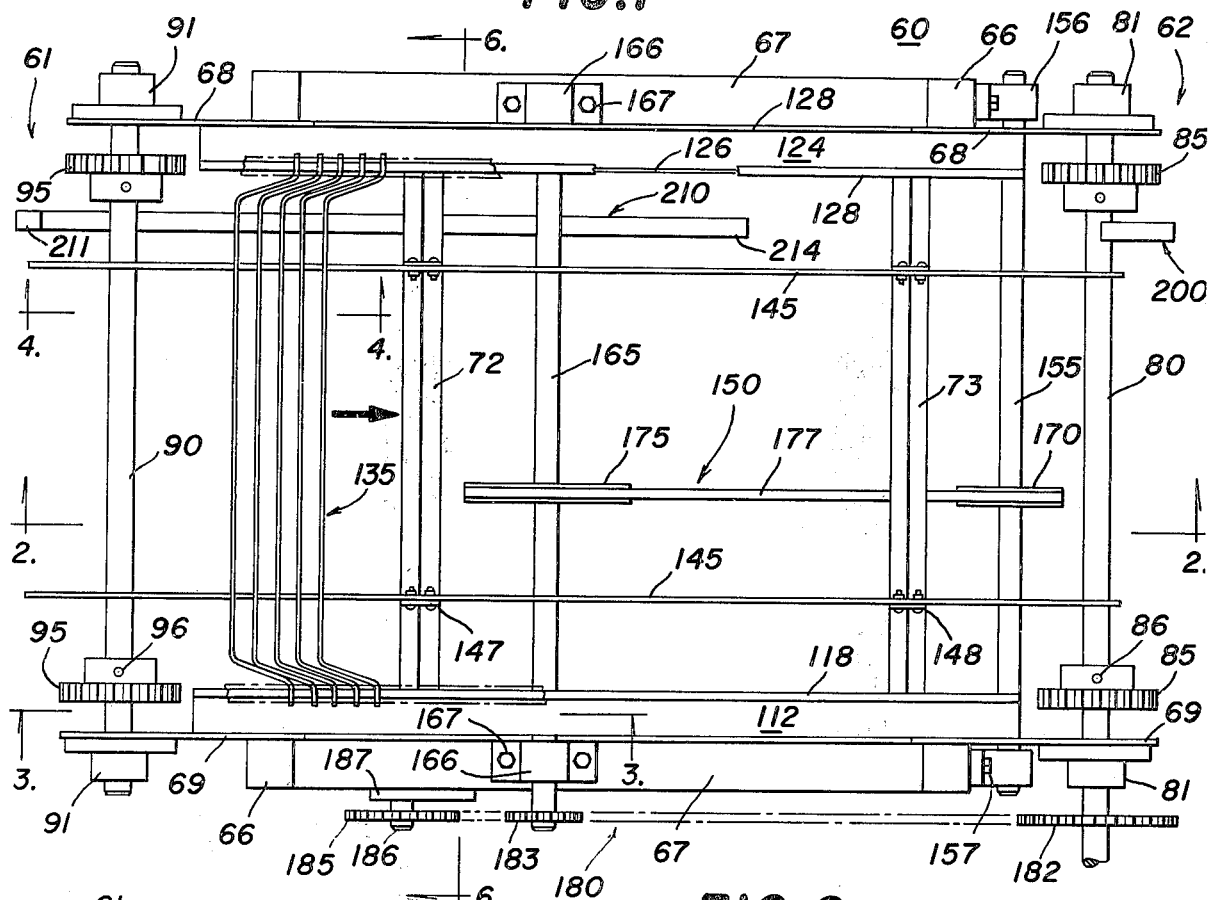
FIG. 1 is a top plan view of a transfer conveyor illustrating the supports and guide structure of the present invention.

Referring now to the drawings and more particularly to FIGS. 1 to 4 thereof, there is shown a system 50 for smoothly transferring articles (not shown) from an associated conveyor 55 to a transfer conveyor 60. As particularly shown in FIGS. 3 and 4, the associated conveyor 55 has an outfeed end 56 thereof spaced close to but spaced apart from the infeed end 61 of the transfer conveyor 60. The transfer conveyor 60 is illustrated in its totality and has both an infeed end 61 and an outfeed end 62. It should be understood that while two conveyors are shown in the present drawings, the invention may be adapted for a series of conveyors each of which having an infeed end and an outfeed end.

The following description is for the transfer conveyor 60, but pertains to any one of the conveyors in a system comprising a plurality of transfer conveyors placed so that the outfeed end of one transfer conveyor is close to the infeed end of another conveyor. Additionally, the conveyors associated with the transfer conveyor 60 may be of entirely different construction than the transfer conveyor, which is useful in many different applications. Particularly the transfer conveyor 60 is useful as a portable unit for transferring articles from stationary conveyors.

The transfer conveyor 60 includes a frame 65 having four upstanding legs 66, positioned at the corners of a rectangle. Two of the legs 66 on each side of the transfer conveyor 60 are interconnected by horizontal members 67 and each of the legs 66 carries a mounting plate extending outwardly therefrom at the top of the leg. Four such mounting plates 68 and 69 are provided with the legs 66 at the bottom of FIG. 1 carrying mounting plates 69 and the legs at the top of the figure carrying the mounting plates 68, the mounting plates 68 and 69 being fixedly held to the respective legs 66 by welds 70, see FIG. 6.

Two spaced apart angle bars 72 and 73 extend transversely of the transfer conveyor 60, the angle bars being mounted by bolts 74, as hereinafter explained. A shaft 80 is positioned at the outfeed end 62 of the transfer conveyor 60 and extends transversely of the conveyor and is journaled for rotation in bearings 81 mounted on the outside of the respective mounting plates 68 and 69. Spaced apart sprockets 85 are mounted on the shaft 80 and are adapted to rotate with the shaft due to the set screws 86 in the collar of the sprockets.

There is a shaft 90 journaled for rotation in bearings 91 at the infeed end 61 of the transfer conveyor 60. The shaft 90 has spaced apart sprockets 95 mounted for rotation with the shaft 90 by means of set screws 96 on the collars of the sprockets. Two chains 100 interconnect respective ones of the sprockets 85 and 95. Each of the chains, as shown in FIG. 7, include inner links 101 and outer links 102 interconnected by hollow rivets 103. The chains 100 are standard articulated chain links and form endless belts having a conveying reach and a return reach.

The transfer conveyor 60 is provided with a side guide 110 which includes a flat side plate 112 mounted on the mounting plate 69 by fasteners 111. A "U" shaped portion 113 of the side guide 110 extends from the bottom of the side plate 112 and has a free upturned end. A flat upwardly slanting plate 114 extends from the top of the side plate 112 and has a vertical upstanding free end 116. The side guide 110 extends the length of the transfer conveyor 60 and is connected to both the mounting plate 69 at the infeed end 61 and also the mounting plate 69 at the outfeed end 62. A runner 118 is mounted on the upstanding free end 116 of the side guide 110 and a runner 119 is mounted on the free end of the "U" shaped portion 113. Each of the runners 118 and 119 extend the entire length of the side guide 110 and may be made of a synthetic organic resin such as Nylon to provide a surface of reduced friction, for a purpose hereinafter set forth.

The transfer conveyor 60 is provided with a second side guide 120 which includes a flat side plate 122 mounted on the mounting plate 68 by fasteners 121. A U shaped portion 123 of the side guide 120 extends from the bottom of the side plate 122 and has a free upturned end. A flat upwardly slanting plate 124 extends from the top of the side plate 122 and has a vertically upstanding free end 126. The side guide 120 extends the length of the transfer conveyor 60 and is connected to both the mounting plates 68 at the infeed end 61 and also at the outfeed end 62. A runner 128 is mounting on the upstanding free end 126 of the side guide 120 and a runner 129 is mounted on the free end of the U shape portion 123. Each of the runners 128 and 129 extend the entire length of the side guide 120 and may be made of a synthetic organic resin such as Nylon, to provide a surface of reduced friction for a purpose hereinafter set forth.

A plurality of supports 135 are freely and rotatably mounted on the conveyor chains 100. Each of the supports 135 includes a straight load bearing or support portion 136 having an angle bend 137 at either end thereof and a mounting end 138 extending outwardly from the bend 137 parallel to the load bearing portion 136. Each of the supports 135 is a one-piece rod bent to provide a load bearing or support portion 136 and two spaced apart mounting ends 138, as hereinbefore described. The ends 138 define an axis about which the support portions 136 are free to rotate. The mounting ends 138 of each of the supports 135 slidably fit within the hollow rivets 103 which form the articulated link chains 100, as shown in FIG. 7. The chains 100 with the supports 135 mounted therein travel along a closed path along the runners 118, 119, 128 and 129, which path includes a conveying reach and a return reach. The reduced friction between the runners and the endless belts, or chains 100, facilitate the operation of the transfer conveyor 60.

Two spaced apart retainer plates 145 are mounted on brackets 146. The brackets 146 are each welded as at 147 to the angle bars 72 and 73 with the plates 145 being mounted by bolts 148 to the brackets 146. The tops of the plates 145 are positioned slightly above the tops of the runners 118 and 128 and serve to retain the supports 135 in the conveying position thereof wherein the load bearing or support portions 136 extend toward the infeed end 61 of the transfer conveyor 60.

A positioning mechanism 150 is mounted on the frame 65 beneath the chains 100. The positioning mechanism 150 includes a shaft 155 journaled for rotation in bearings 156, each of which is mounted to a leg 66 by means of mounting bolts 157. The positioning mechanism also includes a shaft 165 journaled for rotation in bearings 166 mounted on the horizontal frame member 67 by means of mounting bolts 167. A grooved wheel 170 is fixedly mounted on the shaft 155 and a grooved wheel 175 is fixedly mounted on the shaft 165, both wheels being substantially centrally located on the shafts 155 and 165, respectively. An endless belt 177 interconnects the grooved wheels 170 and 175, the belt 177 forming a closed loop between the wheels.

A drive mechanism 180 is provided for the transfer conveyor 60 and the positioning mechanism 150. The drive mechanism 180 includes a sprocket 182 mounted on the outer end of the shaft 80. A sprocket 183 is mounted on the outer end of the shaft 165 in alignment with the sprocket 182, the sprocket 183 being smaller than the sprockets 85 and 95. A sprocket 185 is mounted on a shaft 186 rotatably mounted on the frame 65 by means of a mounting plate 187. A sprocket 190 is mounted on a shaft 191 carried by an arm 192 freely rotatable on the mounting plate 187. A drive chain 195 interconnects the sprockets 182, 183, 185 and 190. A motor (not shown) has the output shaft thereof connected to the shaft 80 whereby rotation of the motor output shaft results in rotation of the shaft 80 and thereby the shafts 155 and 165 with the wheels 170 and 175 mounted thereon, respectively, as well as the chains 100. Since the sprocket 183 is smaller than the sprockets 85 and 95, the shaft 165 and hence the belt 177 will rotate faster than the shafts 80 and 90 and hence the chains 100. Accordingly, it is seen that rotation of the shaft 80 causes the supports 135 carried by the chains 100 to move in the direction of the arrow in FIG. 1, from the infeed end 61 to the outfeed end 62 of the conveyor 60 and causes movement of the belt 177 at a speed faster than the chains 100.

A guide mechanism 200 is provided at the outfeed end 62 of the transfer conveyor 60 and includes a curved plate 201 leading into a flat slanted portion 202 which is integral with a curved portion 203. The guide 200 controls the position of the supports 135 as they move from the conveying position thereof, which is the position they occupy during movement from the infeed end 61 to the outfeed end 62 along the conveying reach, to the storage position thereof, which is the position the supports 135 assume after they disengage from the curved portion 203 of the guide 200.

Figure 4:
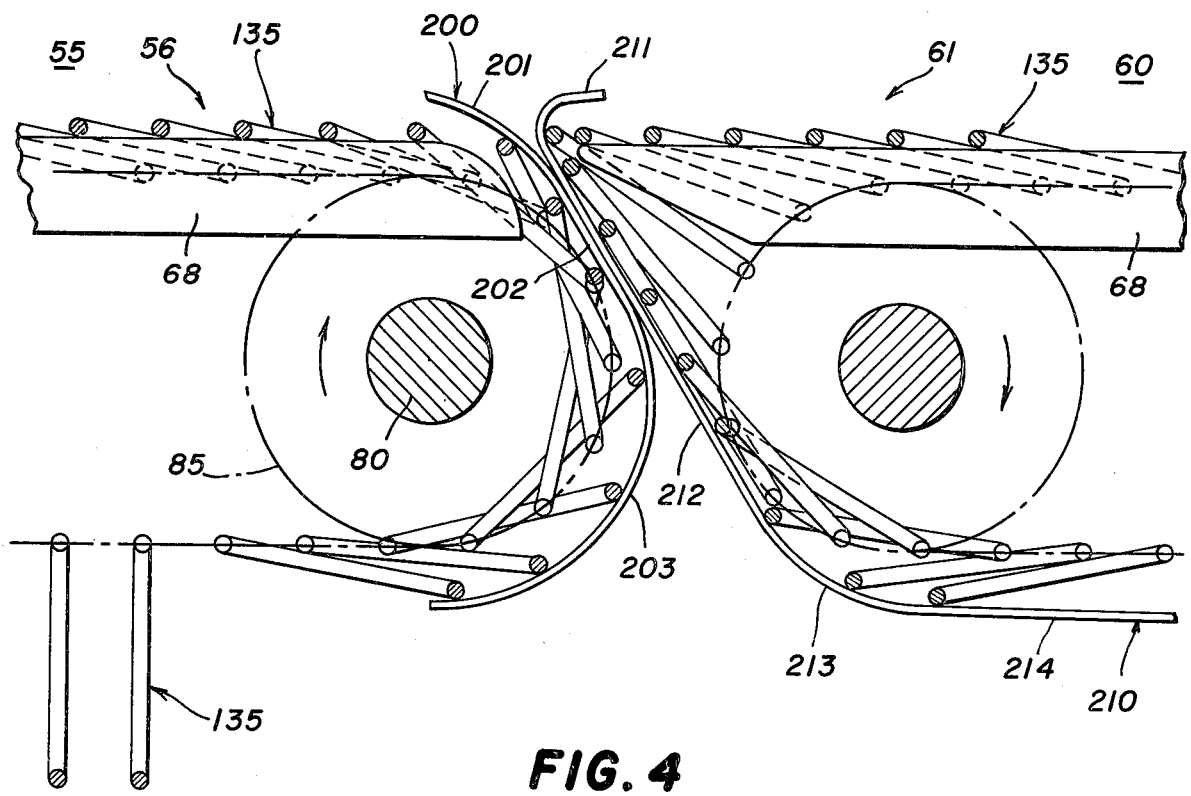
FIG. 4 is an enlarged elevational view of the infeed end of the transfer conveyor illustrated in FIG. 1 and the outfeed end of an adjacent conveyor as viewed along lines 4—4 of FIG. 1.
Figure 8:
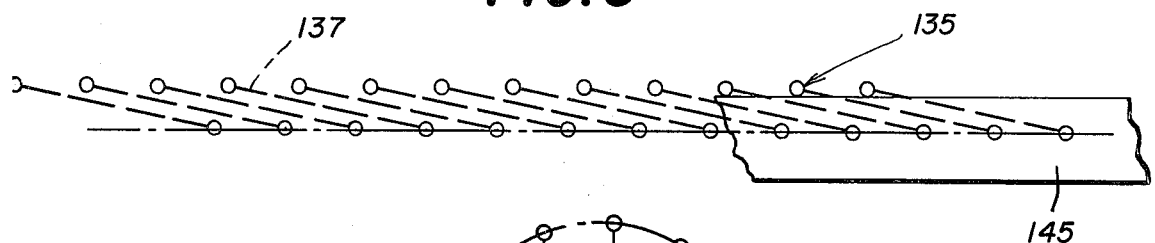
FIG. 8 is a schematic view showing the angle of the supports in the conveying position thereof.

A guide 210 is positioned at the infeed end of the transfer conveyor 60 and controls the position of the supports 135 as they move from the return reach of the closed path to the conveying reach. The guide 210 is a flat one-piece sheet having a hook end 211 lead into a straight flat portion 212 into a curved portion 231 and downwardly slanted flat portion 214. The straight portion 212 of the guide 210 abuts the straight portion 202 of the guide 200 on the associated conveyor 55 and controls the position of the supports 135 as they move to the left as shown in FIG. 4, thereby to position the supports 135 to bridge the gap between the outfeed end 56 of the associated conveyor 55 and the infeed end 61 of the transfer conveyor 60. Transfer of the supports 135 from the bridging position to the conveying position occurs when the supports disengage from the guide 210.

Figure 2:
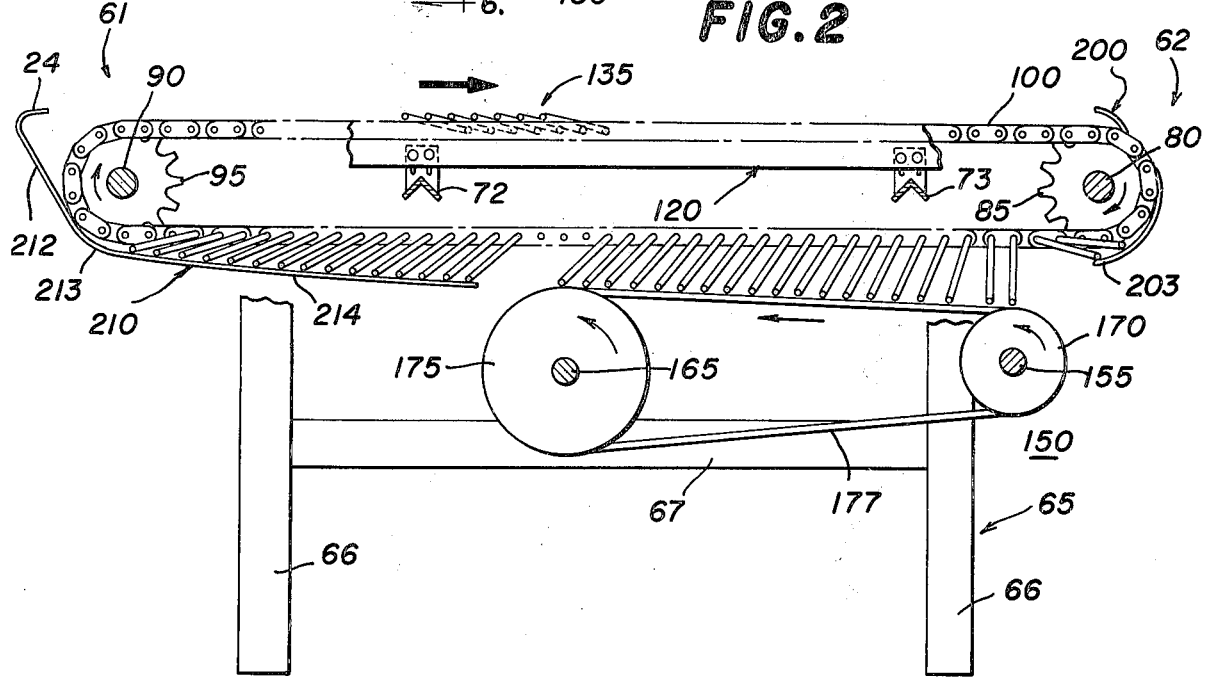
FIG. 2 is a sectional view of the transfer conveyor illustrated in FIG. 1, taken along lines 2—2 thereof.
Figure 3:
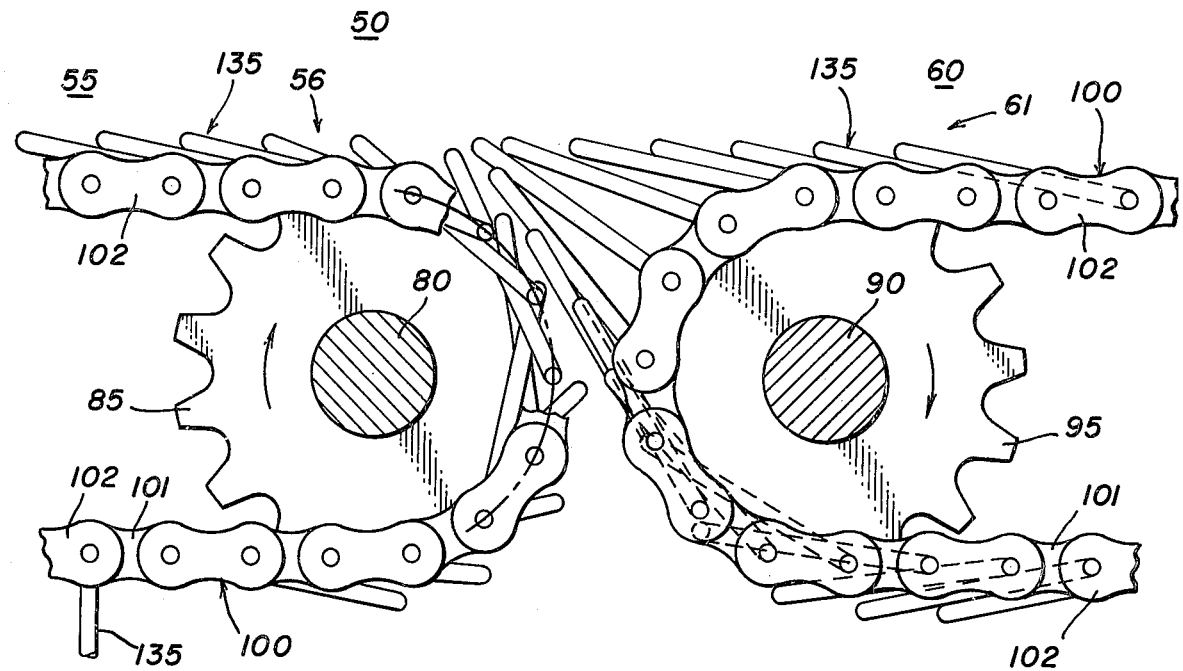
FIG. 3 is an enlarged sectional view of the infeed end of the transfer conveyor shown in FIG. 1 and the outfeed end of an adjacent conveyor taken along lines 3—3 of FIG. 1.

Operation of the transfer conveyor 60 is hereinafter described. The supports 135 are freely rotatable in each of the hollow rivets 103 of the chains 100 thereby allowing the supports to pivot in a 360° circle. After the supports 135 pass the outfeed end 62 of the transfer conveyor 60, the supports are free to assume a vertically downwardly extending or storage position as shown in FIG. 2. The supports 135 during movement between the infeed end 61 and the outfeed end 62, along the conveying reach, are in the conveying position thereof wherein the supports extend toward the infeed end and are maintained in the conveying position by the retaining plate 145.

After the supports 135 are in the vertically downward storage position thereof, the positioning mechanism 150 is more particularly the belt 177 thereof contacts the load bearing or support portions 136 and positions the supports so that they extend toward the infeed end 61 of the conveyor 60, since the belt 177 is traveling faster than the supports. After the supports 135 are thus positioned, the guide 210 and more particularly the return member 214 thereof controls the position of the supports 135 during the movement thereof along the return reach until the supports once again move from the infeed end 61 toward the outfeed end 62 along the conveying reach. During the movement of the supports 135 around the sprockets 95, the guide 210 controls the position of the supports so that the load bearing or support portions 136 thereof bridge the gap between the outfeed end 56 of the associated conveyor 55 and the infeed end 61 of the transfer conveyor 60. The supports 135 which bridge the gap between the two conveyors 55 and 60 facilitate the smooth transfer of articles from the associated conveyor to the transfer conveyor and prevent the heretofore mentioned problems usually encountered during the transfer of articles from one conveyor to another.

The guide 200 positioned on the outfeed end 56 of the associated conveyor 55 controls the position of the supports 135 mounted on the associated conveyor 55 when two transfer-type conveyors are used to prevent interference between the supports on the associated conveyor and the supports on the transfer conveyor 60.

Figure 9:
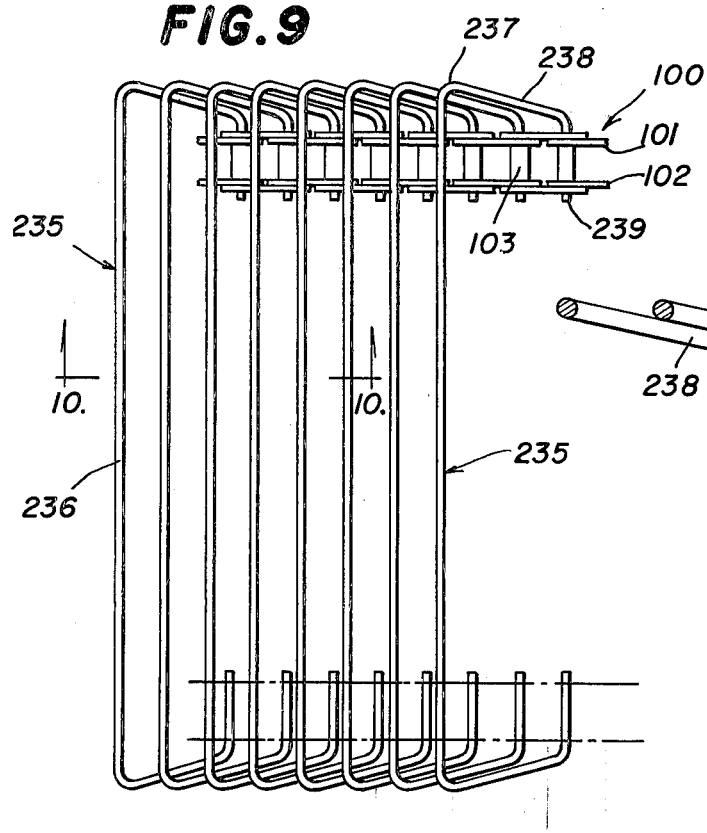
FIG. 9 is an elevational view of a second embodiment of the supports.
Figure 10:
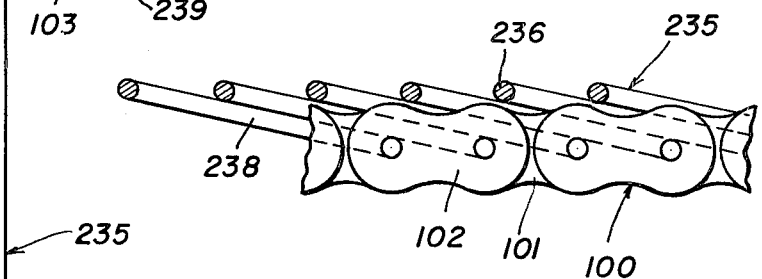
FIG. 10 is an elevational view partly in section of the supports and drive chain assembly illustrated in FIG. 9, as viewed along lines 10—10 thereof.

Referring now to FIGS. 9 and 10 of the drawings, there is disclosed a second embodiment 235 of the supports 135 hereinbefore described. The supports 235 provide an extended load bearing or support portion 236 which extends beyond the associated chains 100. The supports 235 are also constructed of a one-piece rod shaped to provide a load bearing portion 236, bends 237 and straight portions 238 on each end of the supports and inwardly directed mounting portions 239. The rods are resilient which enables the supports 235 to be expanded to allow the mounting portions 239 to fit within each of the hollow rivets 103 of the link chains 100 and to rotate freely about an axis formed by the portions 239. Operation of the transfer conveyor 60 with the supports 235 is the same as hereinbefore described.

Figure 11:
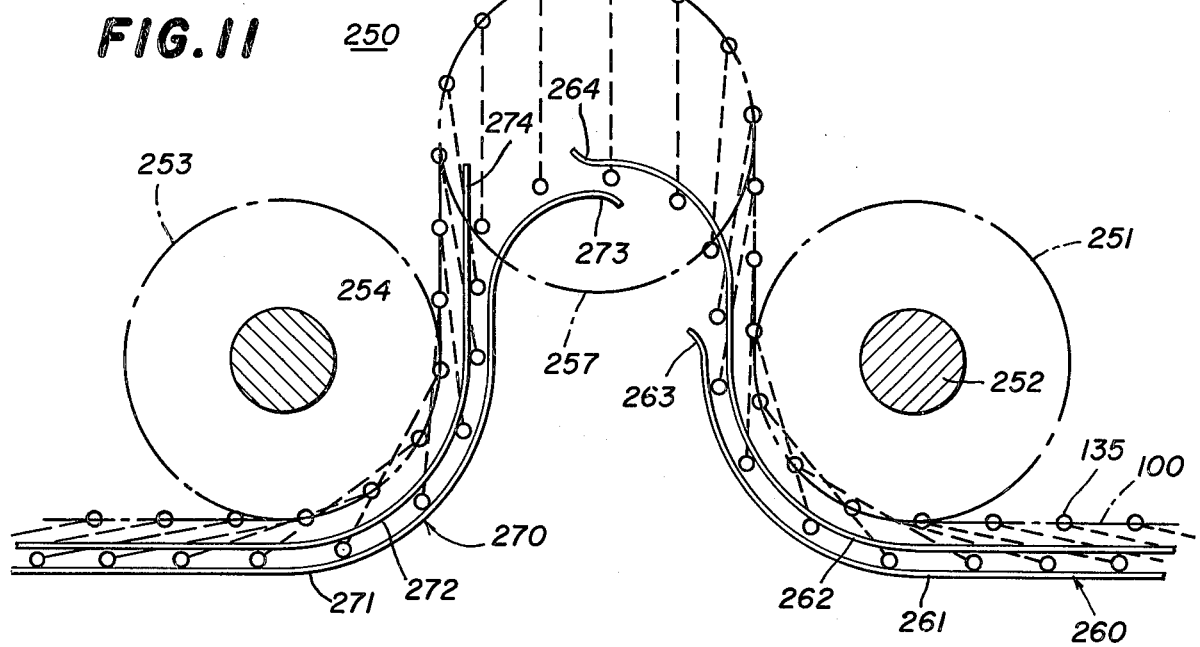
FIG. 11 is a schematic and elevational view of another embodiment for the mechanism for moving the supports from the storage position thereof to the bridging position thereof.

Referring now to FIG. 11 of the drawings, there is shown a second embodiment 250 of the positioning mechanism 150 hereinbefore described. The positioning mechanism 250 includes a wheel 251 mounted for rotation on a shaft 252 positioned below the main conveyor chains 100 and intermediate the infeed end 61 and the outfeed end 62 of the transfer conveyor 60. A second wheel 253 is mounted on a shaft 254 and is spaced from the wheel 251 with the respective shafts and center of rotation lying on the same horizontal plane. An idler gear 257 is mounted intermediate and above the wheels 251 and 253. The positioning mechanism 250 also includes a sinuous trap guide 260 having a lower member 261 and an upper member 262, the lower member having a downward arcuate end 263 terminating above the center of rotation of the wheel 251. The upper guide member 262 has an upward arcuate end 264 terminating above the periphery of the wheel 251 and past the axis of rotation of the idler gear 257.

A sinuous trap guide 270 is also provided with a lower member 271 and an upper member 272. The lower member 271 of the trap guide 270 has an arcuate downwardly extending end 273 positioned below the end 264 and overlapping the end 264, while the upper member 272 has an upwardly extending arcuate end 274 spaced away from and positioned above the arcuate end 273.

Operation of the positioning mechanism 250 is illustrated in FIG. 11 wherein the supports 135 are carried by the chains 100 below the wheel 251 and upwardly and over the idler gear 257 and thereafter downwardly and below the wheel 253. The load bearing or support portions 136 of the supports 135 are trapped in the guide 260 and guided thereby during the travel over the idler gear 257. The upper member 262 provides guidance for the supports 135 until the supports have passed the midpoint of the idler gear 257, at which time the upper member 272 of the guide 270 is positioned to guide the supports 135 along the path toward the infeed end 61 of the transfer conveyor 60. As seen from the figure, the position of the supports 135 is controlled by the guides 260 and 270 during movement of the supports under the wheel 251, over the idler 257 and under the wheel 253 to ensure that the supports 135 are positioned with the load bearing portions 136 thereof extending toward the infeed end 61 of the transfer conveyor 60. The positioning mechanism 250 is completely effective to transfer the supports 135 from the storage position to the bridging position to ensure that the supports are in the proper bridging position during movement therof around the sprockets 95 so that the supports bridge the gap between the outfeed end 56 of the associated conveyor 55 and the infeed end 61 of the transfer conveyor 60.

Although the transfer conveyor of the present invention has been illustrated in connection with an associated conveyor having movable supports, it is clear that the transfer conveyor of the present invention may be used with any type of associated conveyor as well as being used in a series of transfer conveyors of the type described.

While not specifically illustrated, the invention is also applicable to conveyors with turns or for adjacent conveyors forming a turn. In addition, by suitable adjustment of the support guides 210 on the return reach of the conveyor 60 in combination with a reversible motor for the positioning mechanism 150, the conveyor can be made reversible.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A transfer conveyor for smoothly receiving articles from the outfeed end of an associated conveyor disposed adjacent to the infeed end of said transfer conveyor, said transfer conveyor comprising an endless belt movable along a conveying reach from the infeed end of said transfer conveyor to the outfeed end thereof and along a return reach from the outfeed end of said transfer conveyor to the infeed end thereof, a plurality of supports mounted on said endless belt and movable from a conveying position to a storage position and then to a bridging position and back to the conveying position, said supports in the bridging position thereof extending toward the outfeed end of the associated conveyor with said supports at the infeed end of said transfer conveyor overlying the outfeed end of the associated conveyor and bridging the gap between the associated conveyor and said transfer conveyor, motor means for moving said endless belt and said supports mounted thereon in a closed path along said conveying reach and said return reach between the infeed end of said transfer conveyor and the outfeed end thereof, and means for moving said supports when on the return reach of said endless belt from the storage position to the bridging position and when on the conveying reach to the conveying position as said endless belt is driven by said motor means, whereby articles conveyed from the outfeed end of the associated conveyor are received on said supports in the bridging positions thereof and are conveyed along the conveying reach to the outfeed end of said transfer conveyor.

2. The transfer conveyor set forth in claim 1, wherein said endless belt is at least one articulated roller chain.

3. The transfer conveyor set forth in claim 1, wherein said supports are mounted for free rotational movement with respect to said belt.

4. The transfer conveyor set forth in claim 1, and further comprising means for maintaining said supports in the conveying position thereof during movement of said supports along the conveying reach.

5. The transfer conveyor set forth in claim 1, and further including a pair of spaced apart rails extending from the infeed end to the outfeed end of said transfer conveyor and positioned to maintain said supports in the conveying position thereof during movement along the conveying reach.

6. The transfer conveyor set forth in claim 1, and further including control means positioned at the infeed end of said transfer conveyor for maintaining said supports in the bridging position thereof during transfer from the return reach to the conveying reach.

7. The transfer conveyor set forth in claim 1, and further including an arcuate plate extending from the return reach to the infeed end of said transfer conveyor and positioned to control the position of said supports and maintain said supports in the bridging position thereof during movement along the return reach to the conveying reach.

8. A transfer conveyor for smoothly receiving articles from the outfeed end of an associated conveyor disposed adjacent to the infeed end of said transfer conveyor, said transfer conveyor comprising a pair of spaced apart endless belts movable along a conveying reach from the infeed end of said transfer conveyor to the outfeed end thereof and along a return reach from the outfeed end of said transfer conveyor to the infeed end thereof, a plurality of supports mounted on said endless belts and movable from a conveying position to a storage position and then to a bridging position and back to the conveying position, each of said supports being formed of a rod shaped to provide a central support surface with two outwardly extending ends adapted to be freely mounted on said endless belts for free swinging movement about an axis formed by said ends, said supports in the bridging position thereof extending toward the outfeed end of the associated conveyor with said supports at the infeed end of said transfer conveyor overlying the outfeed end of the associated conveyor and bridging the gap between the associated conveyor and said transfer conveyor, motor means for moving said endless belts and said supports mounted thereon in a closed path along said conveying reach and said return reach between the infeed end of said transfer conveyor and the outfeed end thereof, and means for moving said supports when on the return reach of said endless belts from the storage position to the bridging position and when on the conveying reach to the conveying position as said endless belts are driven by said motor means, whereby articles conveyed from the outfeed end of the associated conveyor are received on said supports in the bridging positions thereof and are conveyed along the conveying reach to the outfeed end of said transfer conveyor.

9. The transfer conveyor set forth in claim 8, wherein said endless belts are spaced apart articulated roller chains having said supports mounted therein for free rotational movement with respect thereto.

10. A transfer conveyor for smoothly receiving articles from the outfeed end of an associated conveyor disposed adjacent to the infeed end of said transfer conveyor, said transfer conveyor comprising a pair of spaced apart endless belts movable along a conveying reach from the infeed end of said transfer conveyor to the outfeed end thereof and along a return reach from the outfeed end of said transfer conveyor to the infeed end thereof, a plurality of supports mounted on said endless belts and movable from a conveying position to a storage position and then to a bridging position and back to the conveying position, each of said supports being formed of a rod shaped to provide an extended support surface with two inwardly extending ends adapted to be freely mounted on said endless belts for free swinging movement about an axis formed by said ends, said supports in the bridging position thereof extending toward the outfeed end of the associated conveyor with said supports at the infeed end of said transfer conveyor overlying the outfeed end of the associated conveyor and bridging the gap between the associated conveyor and said transfer conveyor, motor means for moving said endless belts and said supports mounted thereon in a closed path along said conveying reach and said return reach between the infeed end of said transfer conveyor and the outfeed end thereof, and means for moving said supports when on the return reach of said endless belts from the storage position to the bridging position and when on the conveying reach to the conveying position as said endless belts are driven by said motor means, whereby articles conveyed from the outfeed end of the associated conveyor are received on said supports in the bridging positions thereof and are conveyed along the conveying reach to the outfeed end of said transfer conveyor.

11. The transfer conveyor set forth in claim 10, wherein said endless belts are spaced apart articulated roller chains having said supports mounted therein for free rotational movement with respect thereto.

12. The transfer conveyor set forth in claim 10, wherein said extended support surface of each support has a longer longitudinal extent than the distance between said spaced apart belts.

13. A transfer conveyor for smoothly receiving articles from the outfeed end of an associated conveyor disposed adjacent to the infeed end of said transfer conveyor, said transfer conveyor comprising a first endless belt movable along a conveying reach from the infeed end of said transfer conveyor to the outfeed end thereof and along a return reach from the outfeed end of said transfer conveyor to the infeed end thereof, a plurality of supports mounted on said first endless belt and movable from a conveying position to a storage position and then to a bridging position and back to the conveying position, said supports in the bridging position thereof extending toward the outfeed end of the associated conveyor with said supports at the infeed end of the associated conveyor and bridging the gap between the associated conveyor and said transfer conveyor, motor means for moving said first endless belt and said supports mounted thereon in a closed path along said conveying reach and said return reach between the infeed end of said transfer conveyor and the outfeed end thereof, means including a second endless belt positioned to contact said supports in the storage position thereof for moving said supports when on the return reach of said endless belt from the storage position to the bridging position, motor means for moving said second endless belt at a speed greater than the speed of said first endless belt thereby causing said supports contacted by said second endless belt to extend toward the outfeed end of the associated conveyor, and means for moving said supports when on the conveying reach to the conveying position as said first endless belt is driven by said motor means, whereby articles conveyed from the outfeed end of the associated conveyor are received on said supports in the bridging positions thereof and are conveyed along the conveying reach to the outfeed end of said transfer conveyor.

14. The transfer conveyor set forth in claim 13, and further comprising means positioned along the return reach to maintain said supports in the bridging position thereof after contact by said second endless belt.

15. A transfer conveyor for smoothly receiving articles from the outfeed end of an associated conveyor disposed adjacent to the infeed end of said transfer conveyor, said transfer conveyor comprising an endless belt movable along a conveying reach from the infeed end of said transfer conveyor to the outfeed end thereof and along a return reach from the outfeed end of said transfer conveyor to the infeed end thereof, a plurality of supports mounted on said endless belt and movable from a conveying position to a storage position and then to a bridging position and back to the conveying position, said supports in the bridging position thereof extending toward the outfeed end of the associated conveyor with said supports at the infeed end of said transfer conveyor overlying the outfeed end of the associated conveyor and bridging the gap between the associated conveyor and said transfer conveyor, motor means for moving said endless belt and said supports mounted thereon in a closed path along said conveying reach and said return reach between the infeed end of said transfer conveyor and the outfeed end thereof, means including a guide positioned to trap said supports therein for moving said supports when on the return reach of said endless belt from the storage position to the bridging position such that said supports extend toward the outfeed end of the associated conveyor, and means for moving said supports when on the conveying reach to the conveying position as said endless belt is driven by said motor means, whereby articles conveyed from the outfeed end of the associated conveyor are received on said supports in the bridging positions thereof and are conveyed along the conveying reach to the outfeed end of said transfer conveyor.

16. The transfer conveyor set forth in claim 15, wherein said trap guide maintains said supports in the bridging position thereof during movement of said supports along the return reach.

17. A transfer conveyor for smoothly receiving articles from the outfeed end of an associated delivery conveyor disposed adjacent to the infeed end of said transfer conveyor and for transferring the articles to the infeed end of an associated removal conveyor, said transfer conveyor comprising an endless belt movable along a conveying reach from the infeed end of said transfer conveyor to the outfeed end thereof and along a return reach from the outfeed end of said transfer conveyor to the infeed end thereof, a plurality of supports mounted on said endless belt and movable from a conveying position to a storage position and then to a bridging position and back to the conveying position, means for controlling the position of said supports during transfer thereof from the conveying reach to the return reach to prevent interference by said supports with the infeed end of the associated removal conveyor, motor means for moving said endless belt and said supports mounted thereon in a closed path along said conveying reach and said return reach between the infeed end of said transfer conveyor and the outfeed end thereof, and means for moving said supports when on the return reach of said endless belt from the storage position to the bridging position and when on the conveying reach to the conveying position as said endless belt is driven by said motor means, whereby articles conveyed from the outfeed end of the associated conveyor are received on said supports in the bridging positions thereof and are conveyed along the conveying reach to the outfeed end of said transfer conveyor and to the infeed end of the associated removal conveyor.

18. The transfer conveyor set forth in claim 17, wherein said control means is an arcuate plate positioned at the outfeed end of said transfer conveyor constructed and arranged to retain said supports close to the outfeed end of said conveyor to prevent interference by said supports with the associated removal conveyor.

* * * * *